(12) United States Patent
Marsden et al.

(10) Patent No.: US 9,584,474 B2
(45) Date of Patent: Feb. 28, 2017

(54) SIM CARD ACTIVATION

(71) Applicant: Eseye Limited, Surrey (GB)

(72) Inventors: Ian Marsden, Surrey (GB); Paul Marshall, Surrey (GB)

(73) Assignee: ESEYE LIMITED, Surrey (GB)

( * ) Notice: Subject to any disclaimer, the term of this patent is extended or adjusted under 35 U.S.C. 154(b) by 0 days.

(21) Appl. No.: 14/848,503

(22) Filed: Sep. 9, 2015

(65) Prior Publication Data

US 2016/0080931 A1 Mar. 17, 2016

(51) Int. Cl.
*H04M 1/66* (2006.01)
*H04L 29/12* (2006.01)
*H04W 12/06* (2009.01)
*H04W 8/18* (2009.01)

(52) U.S. Cl.
CPC .......... *H04L 61/6054* (2013.01); *H04W 8/18* (2013.01); *H04W 12/06* (2013.01)

(58) Field of Classification Search
CPC ........... H04W 8/04; H04W 8/06; H04W 8/12; H04W 8/18; H04W 8/183; H04W 8/2692; H04W 8/265; H04W 88/02
USPC .............................. 455/433, 552.1, 558, 411
See application file for complete search history.

(56) References Cited

U.S. PATENT DOCUMENTS

| 2010/0210305 | A1 | 8/2010 | Larsson |
| 2012/0295618 | A1 | 11/2012 | Ahmavaara et al. |
| 2014/0098957 | A1* | 4/2014 | Larsson ................. H04L 63/08 380/270 |

FOREIGN PATENT DOCUMENTS

| CN | 10288309 | 1/2013 |
| WO | WO 2009/053918 | 4/2009 |
| WO | WO 2009/073305 | 6/2009 |

OTHER PUBLICATIONS

"3rd Generation Partnership Project; Technical Specification Group Services and System Aspects; Feasibility study on the security aspects of remote provisioning and change of subscription for Machine to Machine (M2M) equipment (Release 9)", 3GPP Draft; 33812-920, 3rd Generation Partnership Project (3GPP), Mobile Competence Centre ; 650, Route Des Lucioles ; F-06921 Sophia-Antipolis Cedex; France. Jun. 22, 2010 (Jun. 22, 2010), XP050912534, Retrieved from the Internet: URL:http://wvw.3gpp.org/ftp/Specs/2014-12/Rel-9/33_series [retrieved on Jun. 22, 2010] * p. 7 * * p. 10-p. 11 * * .

(Continued)

*Primary Examiner* — Temica M Beamer
(74) *Attorney, Agent, or Firm* — Leason Ellis LLP

(57) ABSTRACT

A method of activation of a SIM in a mobile device includes sending an authentication request 30 from the SIM 4 in a mobile device 2 to an HLR 22 corresponding to the mobile network operator of the SIM 4. When the HLR 22 does not contain a record that the SIM is activated, not merely does the HLR 22 return a rejection of the authentication request but additionally a provisioning request 32 to provisioning server 24 is automatically made. The provisioning server 24 then, in response to the provisioning request, updates the HLR so that the HLR does contain a record 23 that the SIM is activated such that subsequent authentication requests from the SIM are not rejected by the HLR. In this way, the SIM is not activated before activation needed. This is of particular utility where the SIM is installed by the manufacturer in M2M apparatus.

12 Claims, 1 Drawing Sheet

(56) References Cited

OTHER PUBLICATIONS

"SmartTrust SmartTrust ODA On-Demand Activation", Jan. 31, 2011 (Jan. 31, 2011), XP055241141, Retrieved from the Internet: URL:https://www.gi-de.com/gd_media/media/en/documents/brochures/mobile_security_2/smarttrust_1/SmartTrust-0DA.pdf [retrieved on Jan. 13, 2016] * the whole document*.

* cited by examiner

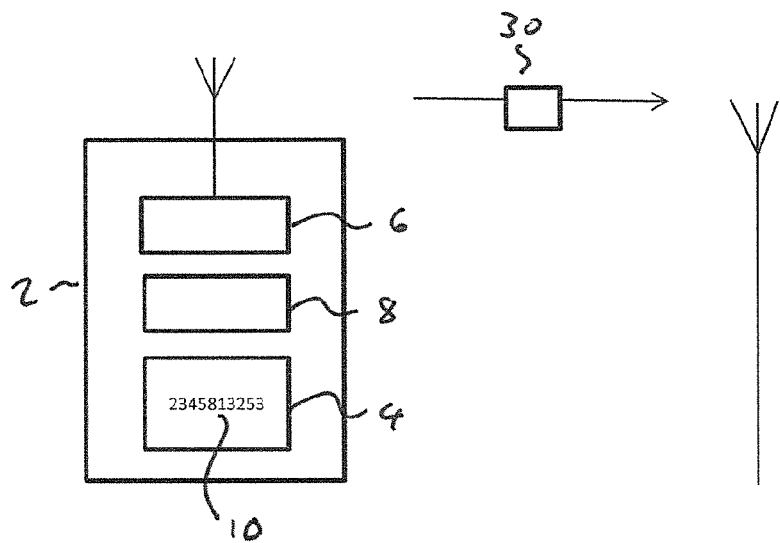
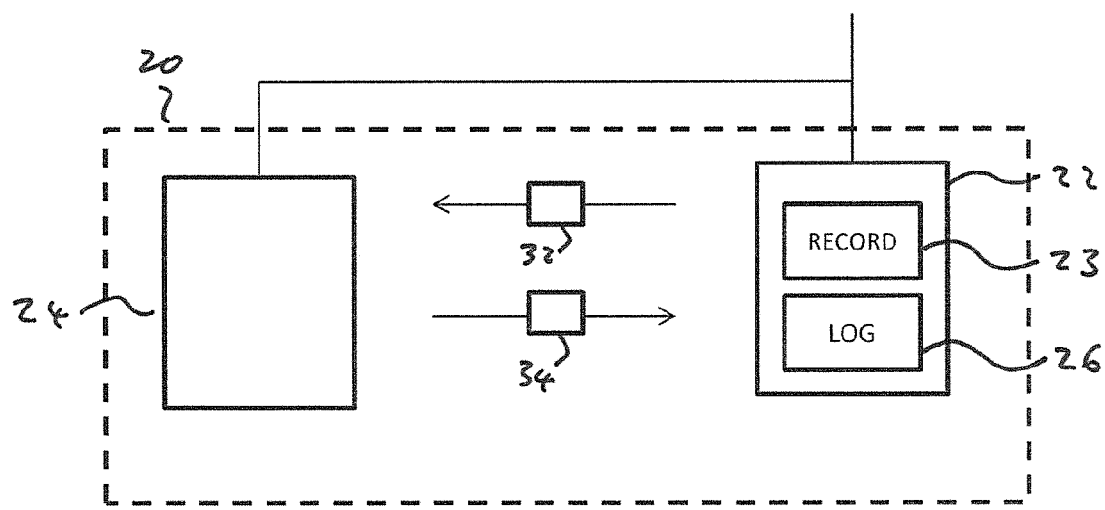

SIM CARD ACTIVATION

CROSS-REFERENCE TO RELATED APPLICATIONS

The present application claims priority under 35 U.S.C. §119 to British Patent Application No. 1416342.2, filed Sep. 16, 2014, which is hereby incorporated by reference in its entirety.

FIELD OF INVENTION

The invention relates to methods of remotely actuating devices using mobile telephony systems, and to the systems themselves.

BACKGROUND TO THE INVENTION

A wide variety of systems exist that may need to make use of mobile communications networks. Typically, such systems are identified to the mobile communications networks using a stand-alone subscriber identity module, SIM, which includes as an identification number an international subscriber identification number, IMSI, issued by a home mobile network.

When setting up a connection, a device containing a SIM sends an authentication request including the IMSI to a local connection point. The local mobile network identifies the home mobile network from the IMSI and transmits an authentication request to the home location register, HLR, of that home mobile network. The HLR then responds to the authentication request with information as to whether or not the SIM is activated and allowed to operate on the network.

The SIM is usually a stand-alone card, typically referred to as a SIM card, issued by a mobile network to customers in a network area. Mobile devices are typically manufactured without the card and the card is then inserted by the customer. It would be beneficial to be able to ship mobile devices with a SIM card already installed. Further, in some cases it would be beneficial to integrate the SIM card in the device, for example by surface mounting the SIM card on a board or alternatively by including the functionality of the SIM in an integrated circuit with additionally other functions.

The requirement of these products is to ensure they are active and ready for use when the product is deployed and to be used, but not active consuming network resources before that point. One approach would be for the installer to perform activation of the SIM using a separate network, for example for the installer to log on to a website to register the IMSI. Alternatively, the SIM may be pre-registered by the device manufacturer whilst in the supply chain and the costs built into the product. Neither of these two options is convenient since both require human intervention.

SUMMARY OF THE INVENTION

According to a first aspect of the invention, there is provided a method of automatically activating a SIM in a mobile device, the SIM comprising an identification of a mobile network operator, MNO having a home location register HLR corresponding to the MNO, the method comprising:

sending an authentication request from the SIM in a mobile device to the HLR, in response to the authentication request, when the HLR does not containing a record that the SIM is activated, returning a rejection of the authentication request and further instigating a provisioning request to a provisioning server for the SIM;

in response to the provisioning request, updating the HLR so that the HLR does contain a record that the SIM is activated such that subsequent authentication requests from the SIM are not rejected by the HLR.

In this way, the SIM can be provided without contract details and subsequently activated only if requires. This allows manufacturers to ship SIMs with devices, especially M2M devices, and only activate those SIMs later in the market where the device is to be used.

Moreover, the method allows for the supply of mobile devices that may never need to make a mobile connection. An example would be a mobile device that only makes a mobile network connection in an emergency situation. For example, the SIM may be included in a remote utilities meter that may be connected via a wire network. There is no need to activate those devices with SIMs that may never be used.

The method is of particular utility where the SIM is embedded in a mobile device, for example being fixedly mounted as a component in the device.

In an embodiment, the provisioning request may be triggered immediately in response to the rejection of the authentication request. This can deliver rapid activation so that the next time the SIM tries to connect, for example a few minutes later, the HLR already contains a record that the SIM is activated.

The provisioning request may be dealt with using real time provisioning.

In an alternative embodiment, the HLR stores information regarding rejection of the authentication request in a rejection log, the method further comprising periodically checking the rejection log, identifying SIMS that should be activated from the rejection log, and activating those SIMS such that subsequent authentication requests from the SIMs are not rejected by the HLR.

The step of updating the HLR may include identifying the location of the mobile device from the mobile network code, MNC, location area code, LAC, and/or cell ID, CI and only updating the HLR corresponding to the SIM if the mobile device is in certain physical locations, referred to as predetermined locations.

In this way, manufacture and test of the mobile device is possible without having to activate the SIMs, by selecting the locations of manufacture and test as the predetermined locations. Further the automatic activation can be restricted to only work in locations where the product is to be deployed.

The method may further include, the first time the step is carried out of updating the HLR corresponding to the SIM so that the HLR does contain an indication that the SIM is activated, carrying out additionally the further step of deactivating the SIM on the HLR a predetermined period later and in a subsequent instance of carrying out the step of updating the HLR record corresponding to the SIM so that the HLR does contain an indication that the SIM is active, the further step of sending an indication of the activation of the SIM to an application/billing server and not subsequently deactivating the SIM on the HLR a predetermined period later.

In the first step, the additional step of deactivating the SIM may be determined by location or period of time. Thus, the SIM may be deactivated in a predetermined location or after a predetermined time.

In this way the mobile device can be authenticated to the network once for testing without activating the SIM for billing purposes. Billing then only occurs in the event of a subsequent use of the SIM.

For increased security, predetermined time periods for communication can be identified, for example a particular ten minute window once a month. The method may include storing the predetermined time periods in an HLR record corresponding to the SIM so that the HLR makes a provisioning request only if the authentication request is made within the predetermined time periods.

In this way, attempt to misuse the SIM/IMSI for purposes or by users other than those intended can be rejected.

Further the additional step of querying an application server to see if the device should be activated before issuing the provisioning request to the HLR, allowing an application server to record sold/decommissioned devices.

Further, the step of updating the HLR corresponding to the SIM so that the HLR does contain an indication that the SIM is activated may be carried out for at most a predetermined number of SIMs in a predetermined time period, the predetermined number of SIMs and predetermined time period being selected to be less than 10% (for example) of the processing capability of dealing with the provisioning request.

This may be of particular interest in the case where the SIM is included in a device to indicate failure. In some circumstances, for example a widespread power outage or flood, multiple devices may fail simultaneously and all seek communication at the same time. By limiting the number of SIMs activated in a predetermined period it can be avoided that all SIMs in an affected area are able to access the mobile network simultaneously, which may reduce the ability of the mobile network to cope with calls from mobile telephones and may also interfere with the operation of emergency services or the emergency response of utility companies.

BRIEF DESCRIPTION OF THE DRAWINGS

An example of the invention will now be described with reference to the accompanying diagrams, in which:

FIG. 1 is a schematic drawing illustrating activation of a mobile device in a mobile network.

DETAILED DESCRIPTION

Referring to FIG. 1, in a first embodiment of a mobile system a mobile device 2 is configured with a fixed SIM 4, mobile transceiver 6 and processor 8. In this device the SIM 4 is separate from the processor but in alternative embodiments the functionality of SIM 4 may be included in the instructions of processor 8. The SIM is manufactured and shipped with an IMSI 10 which includes information on a mobile network operator MNO in the form of a mobile country code MCC and a mobile network code MNC, as well as a mobile subscriber identification number MSISDN which identifies the particular subscriber of that mobile network operator.

The mobile network operator manages a server 20 having an HLR 22. This is shown as a separate function but may alternatively be integrated into server 20. The IMSI 10 of the mobile device is not recorded in HLR 22, or alternatively there is a record 23 of the IMSI 10 but the IMSI is indicated in that record as deactivated.

Accordingly, if the mobile device 2 tries to make a connection to a mobile network it connects to a local cell having a cell ID and sends an authentication request 30 including details of the IMSI 10 of the mobile device. The authentication request 30 is routed, in accordance with standard network protocols, to the HLR 22 corresponding to the mobile network operator identified by the mobile network code part of the IMSI. Since the HLR 22 does not include an entry indicating that the IMSI is activated, the HLR 22 returns a signal indicating that the mobile device is not activated and should not be allowed to connect to the network except to make an emergency call.

However, additionally to this functionality, as well as returning a signal indicating that the mobile device is not activated the HLR 22 also sends an provisioning request 32 to provisioning server 24. The provisioning server 24 then activates the SIM using methods similar to those used in real time provisioning RTP which results in the IMSI 10 being recorded as activated in the HLR 22 indicated schematically as activation message 34. Accordingly, the provisioning server may also be referred to as an activation server. Note that the provisioning is not automatic and checks as to the payment record of the customer and whether the IMSI has been reported as stolen, for example, may be made before sending the activation message to update the record of the IMSI in the HLR.

The next time the mobile device 2 attempts to make a connection it again connects to a local cell with its cell ID and sends an authentication request 30 which is routed to the HLR 22. However, the HLR now contains a record 23 indicating that the IMSI has been activated and hence the HLR returns a signal confirming that the mobile device is known and should be permitted to operate and be accepted on the network.

In this way, the IMSI of the mobile device is activated only when actually required.

It will be noted that in this first embodiment a predetermined period of time, for example 1 to 15 minutes, should be provided between the first authentication request 30 and subsequent authentication requests 30 to allow time for the provisioning request 32 to be actioned.

The mobile device may in particular be a machine to machine, M2M, mobile device that in this way only requires activation when the mobile device is brought into service. There is no need to pay for a contract before the mobile device is used.

A number of alternative embodiments are possible.

In a second embodiment, the HLR does not send provisioning request 32 to activation server 24 but simply records the rejection of a connection request from particular IMSI in log 26. Then, at periodic intervals, for example once every 24 hours, the activation server requests the entries in log 26 and activates those IMSIs for which activation has been requested.

It is likely that not all mobile devices on a particular mobile network will be M2M devices operating in this way. Accordingly, when receiving an authentication request from a SIM which is not indicated as activated at the HLR, a check may be carried out to test if the IMSI of the SIM is in one of a plurality of blocks of IMSIs for which this process is intended. The HLR and/or activation server may accordingly be programmed to activate the SIM only for those SIMs having IMSIs in these predetermined blocks. In this way, additional processing is not required in other circumstances, such as when the SIM for a mobile device has been deactivated by a customer at the end of a contract.

In order to allow for production testing of the mobile device, the HLR can be programmed to only carry out a provisioning request when the mobile device is switched on at a location remote from the manufacturing and/or testing locations where the mobile device is manufactured or tested. The location may be determined by determining the cell ID of the cell to which the mobile device is connected, the cell ID together with the mobile network code and location area code determining the location where the mobile device is with sufficient accuracy for such purposes.

A further approach which allows for testing at the final installation location of the mobile device is that the first time the HLR receives an authentication request from the SIM the HLR issues a provisioning request to the activation server to activate the SIM to allow testing, but also queues a deactivation request a test period of time later, for example 24 hours later. The activation allows the device to be registered on the network for test purposes.

On a subsequent attempt to use the mobile device, after the test period has expired, the HLR again does not indicate that the IMSI is activated but on this occasion the IMSI is activated permanently and the billing service flagged on this second occasion For greater security, the HLR may only accept authentication requests during predetermined time periods, for example during a particular time once a day, week, or month. Any attempt to authenticate the IMSI outside these times may be flagged up as possible abuse by the HLR.

As an additional check the HLR may further query an application server to confirm the provisioning request should be accepted before issuing the provisioning request to the HLR.

The above embodiments are all particularly suitable where the SIM is installed in a device that rarely if ever needs to connect to a network. One example is a device provided by a utility company to indicate if a particular utility supply has failed. The device can then be supplied with an inactive SIM card which is only activated when communication is required. In this way, the utility company does not have to pay for connectivity for devices which never connect to the network.

In such a case, in the case of a general widespread power outage, a large number of SIM devices may simultaneously try to activate. This can cause blockages in the mobile network which may be needed for other reasons. To avoid a flood of devices saturating the network, the HLR can be arranged to limit the number of devices provisioned in a predetermined time period to much less than the number that could be provisioned, for example less than 10%.

The embodiment may also select which devices are to be provisioned, for example to obtain the broadest geographic spread.

Note that the term "mobile device" is not intended to mean that the device is necessarily portable but instead to mean that the device uses a mobile network for communication. Indeed, in many M2M applications mobile devices are fixed in place, for example to provide communications for smart meters fixed by utility companies or for various facilities provided in manufacturing, service or retail environments.

The invention claimed is:

1. A method of activation of a SIM in a mobile device, the SIM comprising an identification of a mobile network operator, MNO having a home location register HLR corresponding to the MNO, the method comprising:
   sending an authentication request from the SIM in a mobile device to the HLR,
   in response to the authentication request, when the HLR does not contain a record that the SIM is activated, further instigating a provisioning request to a provisioning server for the SIM;
   in response to the provisioning request, updating the HLR so that the HLR contains a record that the SIM is activated such that subsequent authentication requests from the SIM are not rejected by the HLR if the authentication request is made within predetermined time periods.

2. The method according to claim 1, wherein in response to the authentication request, when the HLR does not contain a record that the SIM is activated, the method further includes returning a rejection of the authentication request.

3. The method according to claim 1, wherein the provisioning request is triggered in response to the rejection of the authentication request.

4. The method according to claim 1, wherein the HLR stores information regarding rejection of the authentication request in a rejection log, the method further comprising:
   periodically checking the rejection log, identifying SIMs in the rejection log which may be activated, and activating those SIMs such that subsequent authentication requests from the SIMs are not rejected by the HLR.

5. The method according to claim 1, further comprising, when returning a rejection of the authentication request, carrying out a predetermined decision rule to identify whether authentication request was received from a SIM within a predetermined set of SIMs, and only carrying out the step of instigating a provisioning request to a provisioning server for the SIM if the SIM is within the predetermined set of SIMs.

6. The method according to claim 5 wherein the decision rule tests whether the international mobile subscriber identity, IMSI, of the SIM falls within one or more predetermined blocks, each block containing a plurality of sequential IMSIs, the predetermined SIMs being the SIMs with IMSIs falling within the predetermined blocks.

7. The method according to claim 1, wherein the step of updating the HLR contains a step of testing if the location of the mobile device is remote from a predetermined location or locations, and only updating the HLR if the mobile device is remote from the predetermined location or locations.

8. The method according to claim 7, wherein the step of determining if the location of the mobile device is remote from a predetermined location or locations includes identifying the location of the mobile device from mobile network code, MNC, location area code, LAC, and/or cell ID, CI transmitted to the HLR in the authentication request.

9. The method according to claim 1, further comprising, after the first time the step is carried out of updating the HLR so that the HLR does contain an indication that the SIM is activated, the further step of deactivating the SIM on the HLR a predetermined period later; and
   after a subsequent time the step is carried out of updating the HLR so that the HLR does contain an indication that the SIM is activated, the further step of sending an indication of the activation of the SIM to a billing server and not deactivating the SIM on the HLR a predetermined period later.

10. The method according to claim 1, wherein the step of updating the HLR so that the HLR contains an indication that the SIM is activated is carried out for at most a predetermined number of SIMs in a predetermined time period, the predetermined number of SIMs and predetermined time period being selected to be less than 10% of the processing capability of dealing with the provisioning request.

11. The method according to claim 1, wherein the step of updating the HLR corresponding to the SIM so that the HLR contains an indication that the SIM is activated is performed only after also querying an application server.

12. A method of activation of a SIM in a mobile device, the SIM comprising an identification of a mobile network operator, MNO having a home location register HLR corresponding to the MNO, the method comprising:
- sending an authentication request from the SIM in a mobile device to the HLR;
- in response to the authentication request, when the HLR does not contain a record that the SIM is activated, further returning a rejection to the authentication request, carrying out a predetermined decision rule to identify whether the authentication request was received from a SIM within a predetermined set of SIMs and instigating a provisioning request to a provisioning server for the SIM if the SIM is within the predetermined set of SIMs;
- in response to the provisioning request, updating the HLR so that the HLR contains a record that the SIM is activated such that subsequent authentication requests from the SIM are not rejected by the HLR if the authentication request is made within predetermined time periods.

* * * * *